US006240732B1

(12) United States Patent
Allan

(10) Patent No.: US 6,240,732 B1
(45) Date of Patent: Jun. 5, 2001

(54) FLUID MANIFOLD

(75) Inventor: Frederic J Allan, Quebec (CA)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/210,478

(22) Filed: Dec. 14, 1998

(30) Foreign Application Priority Data

Dec. 19, 1997 (CA) .................................................. 2225263

(51) Int. Cl.[7] ........................................................ F02C 7/22
(52) U.S. Cl. .......................... 60/739; 137/561 A; 60/746; 60/749
(58) Field of Search ............................ 60/737, 739, 748, 60/746; 137/561 A; 239/548, 558

(56) References Cited

U.S. PATENT DOCUMENTS

| | | | |
|---|---|---|---|
| 2,963,862 | * 12/1960 | Jay | 60/742 |
| 3,748,852 | * 7/1973 | Cole et al. | 60/725 |
| 3,915,387 | * 10/1975 | Caruel et al. | 60/748 |
| 4,047,877 | * 9/1977 | Flanagan | 60/746 |
| 4,050,238 | * 9/1977 | Holzapfel | 60/39.23 |
| 4,492,563 | * 1/1985 | Reinhold | 239/558 |
| 5,251,447 | * 10/1993 | Joshi et al. | 60/737 |
| 5,319,935 | * 6/1994 | Toon et al. | 60/733 |
| 5,365,738 | * 11/1994 | Etheridge | 60/742 |
| 5,615,555 | * 4/1997 | Mina | 60/742 |
| 6,109,308 | * 8/2000 | Yoneda et al. | 139/302 |

* cited by examiner

*Primary Examiner*—Ted Kim
(74) *Attorney, Agent, or Firm*—W. Warren Taltavull; Manelli Denison & Selter PLLC

(57) ABSTRACT

A fluid manifold (41) comprises two annular chambers (42 and 46) in flow series and having a barrier (45) therebetween. A fluid is fed into the first larger annular chamber (42) and circulates circumferential therethrough before being passed through a plurality of apertures (44) in the barrier (45) to the second smaller annular chamber (46). The fluid circulates circumferentially through the second chamber (46) in the opposite direction prior to its discharge through apertures (50) in a final barrier (48). The apertures (50) in the final barrier (48) decelerate the fluid discharging therefrom to enhance mixing of air with the fluid downstream of the manifold (41).

14 Claims, 3 Drawing Sheets

FLUID MANIFOLD

FIELD OF THE INVENTION

The present invention relates to a fluid manifold and in particular to a fluid manifold for use in the combustion chamber of a gas turbine engine.

Industrial gas turbines are required to meet stringent emission levels. It is known that the production of NOx and CO is a function of the combustion flame temperature which in turn depends upon the combustor air inlet temperature, temperature rise of the combusting fuel/air mixture and the air inlet pressure. In order to limit the production of NOx and CO the temperature and residence time should be controlled.

Series staged combustion controls the levels of NOx and CO produced. In series staged combustion a number of separate combustion zones are used, each being fed by the previous stage. The sequential nature of the staging, whereby combustion products from upstream flames become mixed with downstream flames, provides added benefit to emissions since the undesired combustion emissions from upstream have a chance to be converted to the desired combustion products in the downstream flame. Further the higher the number of stages, the smaller the temperature range required for each stage resulting in the lowest maximum temperature attained by each stage and hence minimum NOx. Each stage provides lean combustion, that is combustion of fuel in air where the fuel to air ratio is low.

In multi-staged combustion chambers the fuel is premixed with air in separate premixing ducts for each stage. Fuel manifolds may be used to feed the fuel into the premixing ducts.

SUMMARY OF THE INVENTION

The present invention seeks to provide a fluid manifold which distributes a fluid such as fuel uniformly and which discharges the fuel at a velocity which enhances mixing of the fuel with air downstream of the manifold.

According to the present invention a fluid manifold comprises a plurality of annular chambers in flow series and having barriers therebetween, fuel being fed into the first annular chamber and circulates circumferentially therethrough before being passed through a barrier to the next annular chamber, the fuel circulating circumferentially around each annular chamber prior to its discharge through a final barrier which changes the velocity of the fuel flow discharging therefrom.

In the preferred embodiment of the present invention the fluid manifold has two annular chambers in flow series, the first annular chamber being larger than the second annular chamber. The fluid flow in the first annular chamber circulates in the opposite direction to the fluid flow in the second annular chamber.

Preferably the barrier between the first and second annular chambers has a plurality of apertures therein. The apertures in the barrier between the first and second annular chambers may be angled to increase the resistance to the passage of fluid from the first annular chamber to the second annular chamber.

The final barrier through which the fluid discharges from the manifold has a plurality of small apertures therein which decelerate the fluid. The apertures may be angled radially to remove any swirl from the fluid discharged from the manifold.

Preferably the fluid manifold is annular and may be used with a liquid or gaseous fluid.

A manifold in accordance with the present invention is for use in a combustion chamber of a gas turbine engine. In particular the manifold is for use in a combustion chamber having multiple combustion chambers in flow series. Each manifold is located in a premix duct of one stage of a multi-staged combustion chamber. The manifold is located by swirler vanes in the premix duct which swirl air, the swirled air mixing with the fuel discharged from the manifold in the premixing duct.

BRIEF DESCRIPTION OF THE DRAWINGS

The present invention will now be described with reference to the accompanying drawings in which.

DETAILED DESCRIPTION OF THE INVENTION

Figure 1:
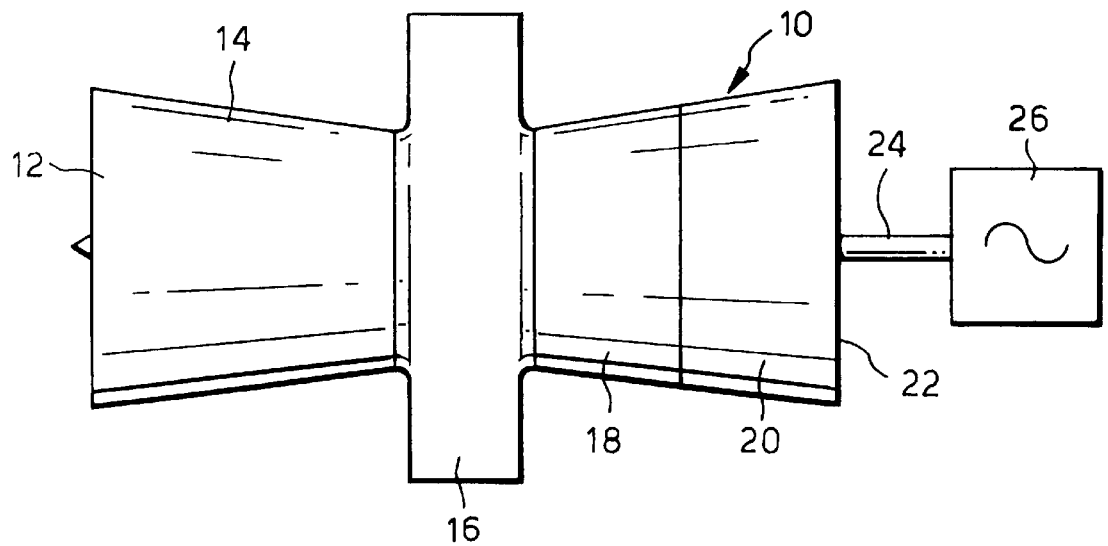
FIG. 1 is a schematic view of a gas turbine engine having a combustion chamber and fuel manifolds in accordance with the present invention.

An industrial gas turbine engine 10, shown in FIG. 1, comprises in axial flow series an inlet 12, compressor 14, a combustion chamber assembly 16, turbine section 18, power turbine section 20 and an exhaust 22. The turbine section 18 is arranged to drive the compressor section 14 via one or more shafts (not shown). The power turbine section 20 is arranged to drive an electrical generator 26 via a shaft 24.

Figure 2:
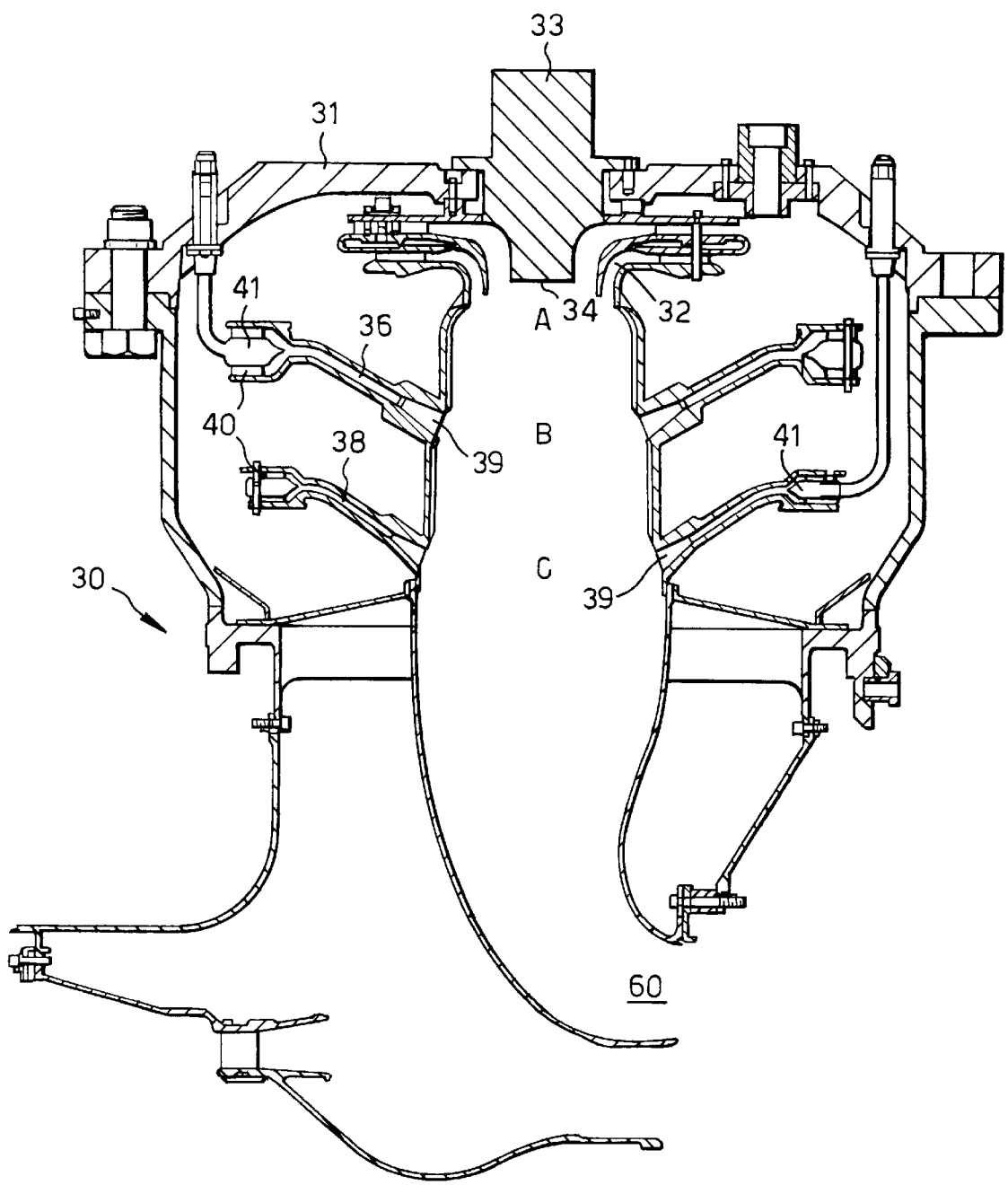
FIG. 2 is a cross-sectional view through the combustion chamber shown in FIG. 1.

The combustion chamber assembly 16 is shown more clearly in FIG. 2 and comprises a plurality of tubular combustion chambers 30. The axes of the tubular combustion chambers 30 are arranged to extend in a generally radial direction. The inlets to the tubular combustion chambers 30 are at their radially outmost ends and the outlets 60 at their radially innermost ends.

Combustion of the fuel is staged in three zones A, B & C which are in flow series. To control the combustion flame temperature and hence NOx and CO levels fuel is premixed with air in separate premixing ducts 32, 36, and 38 for each stage.

In the primary combustion zone fuel and air are mixed in a primary premix duct 32. Fuel is also injected from a central injector 33 located in the upstream wall 31 of each tubular combustion chamber 30 just upstream of the exit of the primary premix duct 32. Several fuel orifices (not shown) are distributed around the injector 33. The number, size and location of the orifices are determined so as to provide best stability and combustion efficiency. A torch igniter 34, which is lit by two spark ignitors (not shown), is provided in the centre of the central injector 33 of each tubular combustor 30. A diffusion flame, initially lit by the torch ignitor 34, is fuelled by the central injector 33. The flame is contained in the primary zone A and stabilised by a recirculating flow generated by the primary premix ducts 32. The diffusion flame is intended for starting and minimum power situations only ie. at power settings below 30% of maximum load.

For power settings between 30–50% of maximum load fuel is also injected into secondary premix ducts 36 forming a uniform mixture which begins burning in the secondary zone B.

Finally for power settings from 50–80% of maximum load fuel is also injected into a tertiary premix ducts 38 forming a uniform mixture which begins burning in the tertiary zone C.

The secondary and tertiary premix ducts 36 and 38 each supply a fuel/air mixture to the burner in a ring of jets which penetrate and mix with the gases from the upstream stages. To create the discrete jets, each premix duct 36 and 38 ends with aerodynamic partitions 39, wedges, whose base form part of the combustor liner.

Swirlers 40 are provided at the inlet to the secondary and tertiary ducts 36 and 38. The swirlers 40 are of an efficient aerodynamic design to accelerate the air passing therethrough. The swirlers 40 have a counter-swirling configuration so that they produce a shear layer which gives good mixing of the air and fuel.

The inlet to the secondary and tertiary ducts 36 and 38 is at a large radius from the burner centerline. To minimise the length of the ducts 36 and 38 the most vigorous method was sought to mix premix gas with the air. Vigorous mixing is achieved by injecting the fuel at a low velocity into the shear layer formed between the air flows from the counter-rotating swirlers 40.

The partition between the counter-rotating swirlers 40 is a manifold 41 to which premix fuel is supplied. The external profile of the manifold 41 has been optimised to give the air passing over it the best aerodynamic performance. The internal configuration of the manifold 41 is designed to even out any non-uniformities in the fuel flow and feed the fuel in a uniform manner into the premix duct 36.

Figure 3:
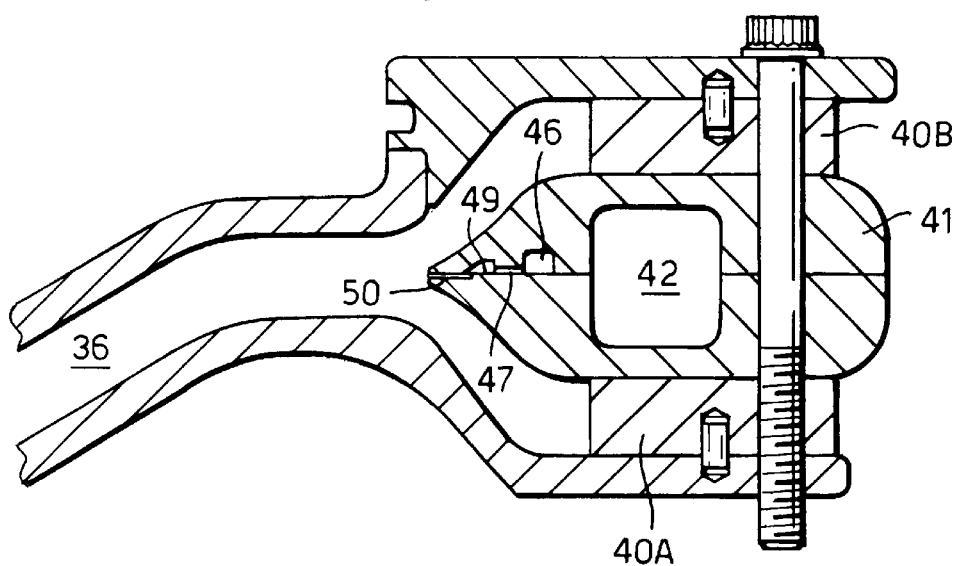
FIG. 3 is an enlarged cross-sectional view through one of the fuel manifolds shown in FIG. 2.
Figure 4:
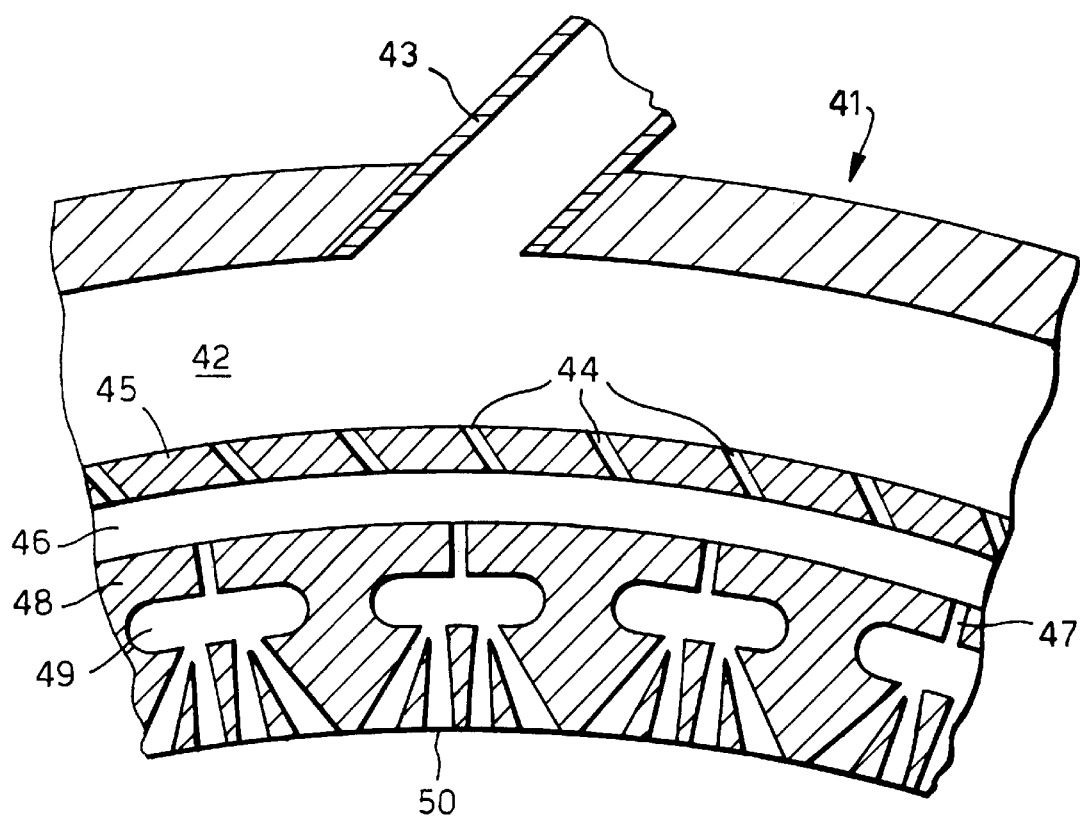
FIG. 4 is a cross-sectional view through part of a fuel manifold in accordance with the present invention.

The internal configuration of a fuel manifold 41 in accordance with the present invention is shown in more detail in FIGS. 3 and 4. Each manifold 41 consists of a large annular chamber 42 fed by one of more feed pipes 43. The feed pipes 43 are attached to the circumference of the manifold 41 at an angle. In the preferred embodiment of the present invention three feed pipes 43 are attached to the circumference of the manifold 41. Each feed pipe 43 is attached at the same angle relative to the tangent of the circle at the point of attachment and the feed pipes 43 are equally spaced around the circumference. In this way the fuel flowing into the annular chamber 42 is given a strong circumferential motion. Each feed pipe makes an angle of no more than forty five degrees so that the majority of the fluid momentum goes into the circular motion rather than raising the local static pressure.

The dimensions of the annular chamber 42 are such that relative to the speed of the circulating flow the fuel residence time is several times greater than the time it would take the average fuel element to circumnavigate the chamber 42. In the preferred embodiment of the present invention the fuel swirls around the circumference of the large annular chamber 42 four–eight times.

On an interior wall 45 of the manifold, opposite where the feed pipes 43 are attached, are numerous identical and equally spaced exit passages 44. The holes 44 are orientated at an angle such that the flow entering one of the holes 44 makes a turn of about one hundred and thirty five degrees. Due to this acutely sharp turn the passage 44 entrance has an effective flow area much smaller than its geometric area. In this way the problem of making many holes with very small identical flow areas is diminished. Furthermore this orientation makes the holes less sensitive to being located near a feed pipe 43 since any momentum hitting a hole from a nearby feed pipe 43 will be perpendicular to the hole direction.

The fuel passes from the large annular chamber 42 thorough the passages 44 in interior wall 45 to a smaller annular chamber 46 where it circulates in the opposite direction. The fuel then passes though small radial holes 47 in a wall 48 to a plurality of separate cavities 49. Fuel is fed from the cavities 49 to etched diffusers 50 and discharges from the trailing edge of the fuel manifold 41 into the premix duct 36.

The largest pressure drop in the fuel manifold 41 takes place between the two chambers 42 and 46 and the radial holes 47 in the wall 48 discourage swirl at the entry to the diffusers 51. The slits 49 decelerate the fuel and is discharged from the trailing edge of the fuel manifold 41 into the premix ducts.

The fuel discharges from the trailing edge of the manifold 41 and is mixed with the counter-swirling flows of air from the swirlers 40A, 40B located in the inlet of the premix ducts 36 and 38.

The fuel/air mixture from the premix ducts 36 and 38 penetrates and mixes with the gases from the upstream combustion stages.

The sequential nature of the staging, whereby combustion products from upstream flames become mixed with downstream flames provides added benefit to emissions since the undesired combustion emissions from upstream have a chance to be converted to the desired combustion products in the downstream flame.

Although the manifolds have been described for use in a combustor 30 of a gas turbine engine it will be appreciated that they could be used in any application where a circular uniform distribution of a fluid, either gaseous or liquid, is required.

It will be further appreciated by one skilled in the art that a manifold 41 in accordance with the present invention may have any number of annular chambers 42 and 46 provided a uniform circumferential distribution of the fluid is achieved. If several annular chambers are to be implemented to obtain the required uniformity the passages 44 and 47 should decrease in size and increase in number with each stage. The manifold residence time and the pressure drop should decrease with each stage. Circumferential flow is eliminated in the last stage by making its feed holes radial. Similarly the manifold 41 could decelerate or accelerate the fluid discharged therefrom.

I claim:

1. A fluid manifold comprising a plurality of annular chambers arranged substantially concentrically in flow series with a barrier between each chamber and a subsequent chamber, means to supply a fluid into a first one of said annular chambers comprising at least one pipe arranged at an angle to the first one of said annular chambers such that the fluid inflows circumferentially through the first one of said annular chambers to produce a circular flow through the first one of said annular chambers before being passed through a barrier to the next annular chamber, each barrier having means to supply a fluid into a respective annular chamber comprising at least one aperture arranged at an angle to the respective annular chamber such that the fluid inflows circumferentially through each annular chamber to produce a circular flow through each annular chamber prior to its discharge through a final barrier which changes the velocity of the fluid in flow discharging therefrom.

2. A fluid manifold as claimed in claim 1 having two annular chambers in flow series, the first annular chamber being larger than the second annular chamber.

3. A fluid manifold as claimed in claim 1 in which the fluid in the first annular chamber circulates in the opposite direction to the fluid in the second annular chamber.

4. A fluid manifold as claimed in claim 1 in which the barrier between the first and second annular chambers has a plurality of apertures therein.

5. A fluid manifold as claimed in claim 4 in which the apertures in the barrier between the first and second annular chambers are angled so as to increase the resistance to the passage of fluid from the first annular chamber to the second annular chamber.

6. A fluid manifold as claimed in claim 1 in which the final barrier through which the fluid discharges from the fluid manifold has a plurality of small apertures therein which decelerate the fluid.

7. A fluid manifold as claimed in claim 6 in which the apertures are angled to remove any swirl from the fluid discharged from the manifold.

8. A fluid manifold in accordance with claim 1 including means for supplying a liquid or gaseous fuel to said at least one pipe.

9. A fluid manifold as claimed in claim 1 wherein the pipe is arranged at an angle of no more than 45 degrees.

10. A fluid manifold as claimed in claim 9 wherein the combustion chamber comprises a primary combustion zone, a secondary combustion zones and a tertiary combustion zone arranged in flow series.

11. A fluid manifold as claimed in claim 10 wherein the combustion chamber comprises a primary premix duct to supply a fuel and air mixture to the primary combustion zone, a secondary premix duct to supply a fuel and air mixture to the secondary combustion zone and a tertiary premix duct to supply a fuel and air mixture to the tertiary combustion zone.

12. A fluid manifold as claimed in claim 11 wherein the fluid manifold supplies fuel into the secondary premix duct or the tertiary premix duct.

13. A fluid manifold as claimed in claim 12 wherein the fluid manifold is arranged between a first swirler and a second swirler, the first and second swirlers are arranged to swirl in opposite directions.

14. A fluid manifold as claimed in claim 13 wherein the fluid manifold (14) is arranged between a first swirler and a second radial swirler and the fluid manifold discharges the fluid outwardly.

* * * * *